Sept. 25, 1956     L. E. BROBERG ET AL     2,764,320
ADJUSTABLE HOOD FOR UNLOADER TROUGH OF A STORAGE TANK
Filed July 9, 1953     2 Sheets-Sheet 1
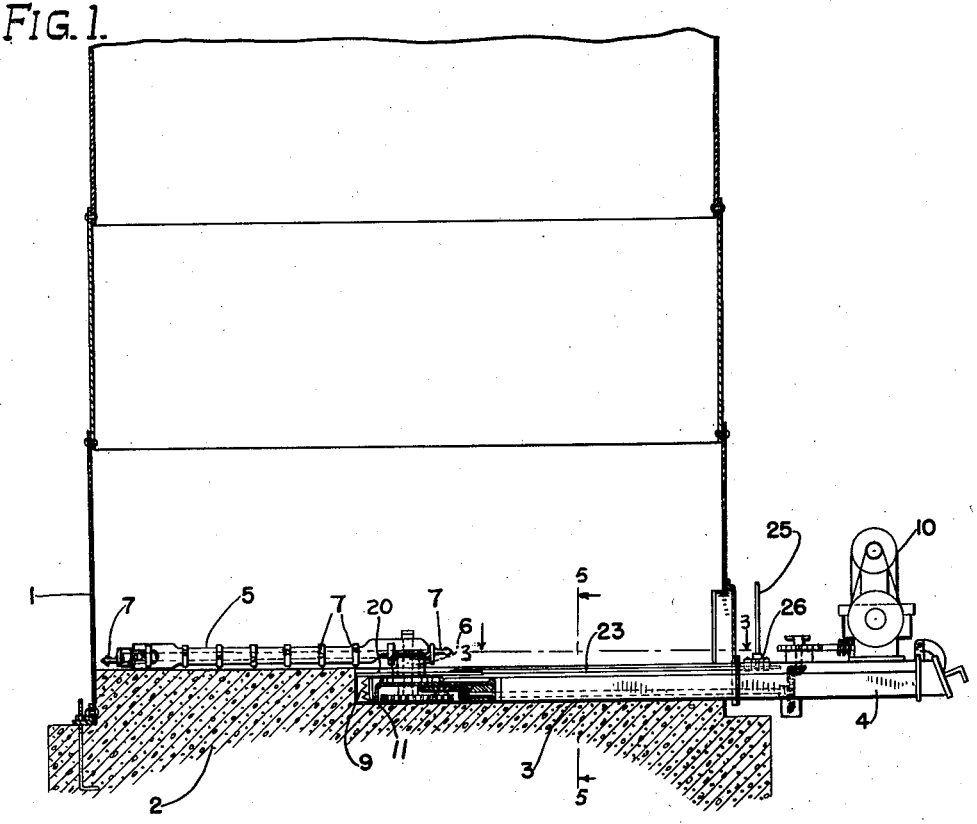
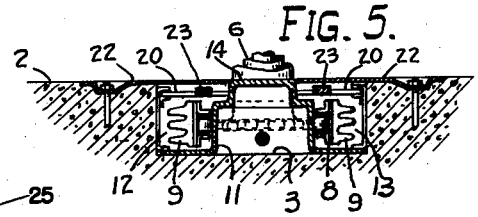
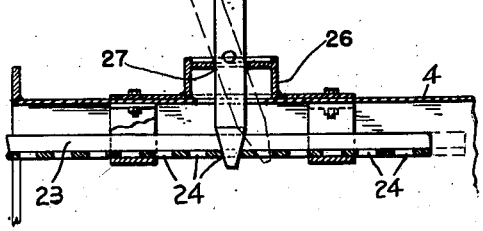
INVENTORS:
LEONARD E. BROBERG
ERWIN G. DUERINGER
BY *Andrus & Sceales*
ATTORNEYS

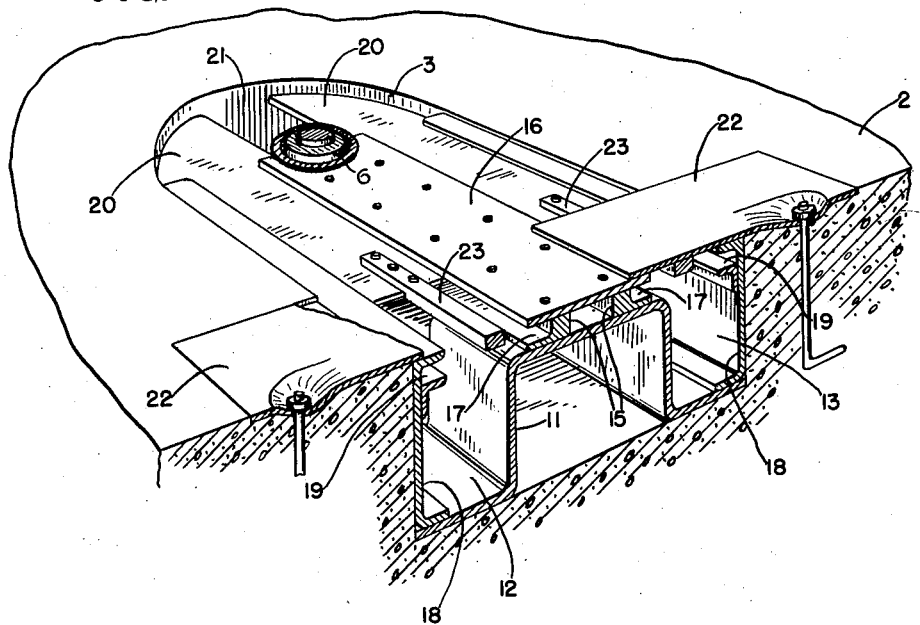
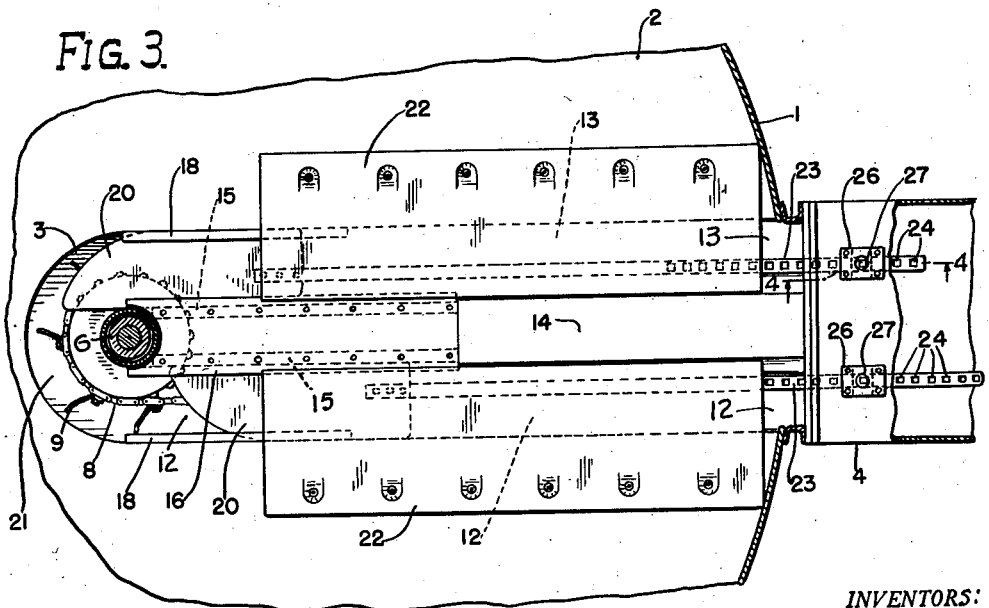

United States Patent Office 2,764,320
Patented Sept. 25, 1956

2,764,320

ADJUSTABLE HOOD FOR UNLOADER TROUGH OF A STORAGE TANK

Leonard E. Broberg and Erwin G. Dueringer, Milwaukee, Wis., assignors to A. O. Smith Corporation, Milwaukee, Wis., a corporation of New York Application July 9, 1953, Serial No. 367,064

2 Claims. (Cl. 222—226)

This invention relates generally to bottom unloading apparatus for unloading materials which are stored in a storage structure, such as a silo, and more particularly to apparatus for controlling the flow of materials to the conveyor which carries the materials to the outside of the structure.

One form of bottom unloading apparatus comprises, in general, a cutter arm and a conveyor. The cutter arm, equipped with a plurality of teeth adapted to move longitudinally of the arm, is disposed above the conveyor and is rotatably mounted in the center of the structure to rotate around the floor of the structure to dislodge the stored materials and move the materials to the center of the structure. At the center of the structure the loosened stored materials fall into a trough in which the conveyor is disposed. The conveyor in turn moves the materials longitudinally of the trough to the outside of the structure.

For ordinary silage which is a generally fibrous material and therefore not free flowing, the inner end of the trough can remain open, the conveyor being capable of handling all the material delivered by the cutter arm. Storage structures of this type, however, are also adaptable for storage of finely ground or chopped materials such as meat scrap, soybean meal, etc. which are somewhat free flowing. Because of the free flowing character of these materials, and with the inner end of the trough completely open, it has been found these materials flow to the conveyor too rapidly and tend to clog or freeze up the conveyor. This invention discloses apparatus for overcoming this difficulty.

Briefly this invention comprises a pair of wing-like plates slidably disposed above the conveyor which in their closed position cover a major portion of the opening at the inner end of the trough. Suitable guide-ways are provided wherein the plates may slide longitudinally of the trough to control the size of the opening and therefore the discharge rate to the conveyor. A rod attached to each plate and extending longitudinally of the trough to the outside of the storage structure provides means for moving the plates longitudinally.

An object of this invention is to provide a bottom unloader storage structure with means to control the flow of the stored materials to the conveyor which brings the material to the outside of the structure.

Another object of this invention is to prevent clogging or freezing up of the discharge conveyor by free flowing materials.

Another object of this invention is to adapt the unloading means of a bottom-unloaded storage structure of the type primarily used for storing and unloading fibrous, non-free flowing materials for use in storing and unloading finely ground or chopped free-flowing materials.

Another object of this invention is to adapt the unloading means of a bottom-unloading storage structure, of the type for storing and unloading fibrous, non-free flowing materials, for storing and unloading both fibrous, non-free flowing materials and finely ground or chopped free-flowing materials in alternate layers within the structure.

These and other objects will appear from the following description of the invention when read in conjunction with the drawings in which:

Figure 1 is a vertical section of the lower part of a cylindrical storage structure;

Fig. 2 is a view in perspective showing the invention with the plates in closed position;

Fig. 3 is a fragmentary section view taken on line 3—3 of Figure 1 with one of the plates moved to an open position;

Fig. 4 is a fragmentary view taken on line 4—4 of Figure 3; and

Fig. 5 is a transverse section taken on line 5—5 of Figure 1.

In Figure 1 is shown a cylindrical storage structure 1, such as a silo, firmly secured to a foundation 2. The structure is preferably of an air-tight construction and for corrosion resistance may be lined both inside and out with glass, plastic or the like. Suitable apparatus, not shown, for loading the structure is provided at the top thereof.

The foundation 2 is preferably made of concrete and provides a smooth even floor at the base of the structure. A trough 3 is provided in the foundation 2 for removal of the contents of the structure and extends radially substantially from the center of the structure to the exterior wall thereof. A discharge conduit 4 is aligned with the trough and extends to the outside of the structure.

To loosen the material inside the structure 1 for removal to the outside, a cutter arm 5 is rotatably mounted about a post 6 disposed in the trough 3 at the center of the structure. A plurality of teeth 7 moving longitudinally of the arm 5 dislodges the stored material and moves the same to the center of the structure where the material falls into the trough 3. An endless chain conveyor 8 equipped with lugs 9 is disposed in the trough 3 and conducts the loosened materials along the trough to the outside of the structure. Suitable driving means 10 located exteriorly of the structure are provided to operate the cutter arm 5 and conveyor 8.

A base casting 11 rests on the bottom of the trough 3 and extends radially substantially from the center of the structure to the outside. The base casting 11 has a generally U-shaped cross section with wide flanges and rests in inverted fashion on the bottom of the trough, the flanges extending to the respective side walls of the trough. Being disposed along the center of the trough the base casting 11 forms two channels 12 and 13, on either side of the casting in which the endless chain of the conveyor 8 travels. The outer end of the base casting 11 has a flat raised portion 14, the height of which is generally at the level of the floor of the structure. The inner end of the casting 11 has a vertical bearing post 6 located centrally of the silo wall.

Angle-bar guides 15 are secured to the crest of the base casting 11 adjacent the channels 12 and 13 and extend radially outward from the center post 6 to the raised portion 14 of the base casting. A plate 16 extends over the angle-bar guides 15 and together these members form the grooves or ways 17 along the inside of the respective channels 12 and 13.

A guide member 18 is disposed adjacent the side walls of the trough 3 opposite the ways 17. The member 18 is formed of a vertical web with three horizontal flanges extending inwardly therefrom. The bottom flange of the guide member 18 is secured to the transverse extremity of the flanges of the base casting 11 such that the webs of the guide members are contiguous with the respective side walls of the trough. The top flange and the intermediate supporting flange positioned a short distance below the top flange, form a groove or way 19 along each of the trolgh side walls. Ways 19 are aligned horizontally with the ways 17 formed on the base casting 11. The ways 17 and 19 cooperate to receive and support the longitudinal edges of the adjustable hoods 20 hereinafter to be described.

The two adjustable hoods 20 comprise plates of a width to slidably engage the grooves 17 and 19 and cover the inner portion of the channels 12 and 13 formed on each side of the base casting 11. The inner end of the hoods 20 are curved to the contour of the inner end of the trough 3. In their innermost position, which is the closed position as shown in Fig. 2, the hoods 20 extend outwardly a short distance beyond the center of the storage structure. When the hoods 20 are in the closed position there is a small opening 21 located between the inner opposed edges of the hoods adjacent post 6 which permits the stored materials to enter the conveyor channel. Subsequent adjustment of hoods 20 results in enlargement of opening 21. Where greater restriction is desired than shown by opening 21 in Fig. 2, a plate member, not shown, may be attached to one of the hood members 20 to cover the opening 21, in which event adjustment is accomplished by the other of the hood members.

In order that cutter arm 5 may travel rotatably across the trough area in its sweep around the floor of the structure, cover plates 22 are placed transversely across the channels 12 and 13 and are flush with raised portion 14 of base casting 11. Cover plates 22 are countersunk in the concrete foundation along the sides of the trough to maintain floor level. The plates 22 extend longitudinally of the trough from the wall of the storage structure inwardly to overlap the adjustable hoods 20 in their closed position.

To effect adjustment of hoods 20 a rod 23 is attached to each hood and extends longitudinally of the trough to the exterior of the storage structure. The outer end of the rods 23 are provided with a series of spaced holes 24 for engagement by an operating lever 25 to adjust the position of the hood members 20. Guides, not shown, may be provided for rods 23 intermediate the extended portion of hoods 20 and the structure wall.

On the exterior of the storage structure each rod 23 passes through a fulcrum box 26 mounted on discharge conduit 4 on the outside of the structure. Each fulcrum box 26 comprises a flanged collar with channel-shaped bearing members disposed downwardly therefrom. The rods 23 are slidably disposed in said bearing members. A restricted hole 27 is provided centrally of the collar in vertical alignment with holes 24 of rod 23.

To operate the hoods 20 the manually operated lever 25 is inserted through hole 27 of the fulcrum box 26 and engages one of the holes 24 of rod 23. To prevent excessive penetration of the holes by lever 23, the lever may be equipped with a stop pin or the like. The holes 24 in rod 23 are spaced in such manner that a manual thrust against lever 25 in the engaging hole places the next succeeding hole 24 in alignment with the hole 27 in the fulcrum box 26 and moves the adjustable hood 20 in its ways 17 and 19 an equivalent distance. Thus with alternating engagements and withdrawals of lever 25 in succeeding holes 24 the rod 23 may be advanced or returned to effect desired adjustment of the hood members 20 resulting in consequent adjustment of the opening 21 to the trough conveyor 8.

The usefulness of a storage structure of the type described is greatly enhanced by virtue of this invention. Formerly storage structure of this type were limited to storage of fibrous, non-free flowing materials. If finely chopped free-flowing materials were introduced for storage, they filled the conveying trough so rapidly because of their free flowing characteristic that the conveyor clogged or froze up. A freeze up of this type required withdrawal of the unloading apparatus from the trough, cleaning of the apparatus, and return thereof. Returning the unloading apparatus into the structure required mechanism to bore its way through the materials which fell into the trough while the apparatus was removed. Obviously, this operation was very time consuming. The adjustable hood of this invention permits adjustment of the size of the opening to the conveyor to suit the requirements of the material being unloaded to prevent overloading and consequent freeze up of the conveyor. For ordinary silage made from corn, which is fibrous and not free flowing, the adjustable hoods may be completely opened. For finely chopped or ground materials like meat scrap or soybean meal, which are free flowing, the hoods can be completely closed leaving but a small opening. For the materials which fall between these extremes proper adjustment of the hood members can be easily made by the operator.

Various embodiments of the invention may be employed within the scope of the following claims.

We claim:

1. In a bottom unloaded storage structure having a trough in the floor extending radially outwardly from the center of the floor and having a conveyor adapted to move circumferentially over the floor and convey the material to be removed to a second conveyor rotating in said trough, the improvement which comprises, a channel-shaped member disposed longitudinally in the trough with the flanges of said member overlying the floor of the trough and the central web of the channel extending slightly below the floor of the structure to divide the trough in two separate passages for rotation of the second conveyor therein, side plate members secured over the side walls of the trough with an upper flange on each member projecting inwardly of the trough at about the level of the floor of the structure, a guide rail secured to each plate member slightly below said upper flanges to provide a way extending substantially the length of the trough, a right angle bar secured to the central web of the channel member on either side thereof and opposite the said guide rails, a plate overlying the angle bars to provide a way in cooperation with the bars on each side of the web of the channel and opposite to the ways adjacent the wall of the trough, a plate disposed in each way on either side of the central web and adapted to move longitudinally of the trough to control the size of the opening to the trough for receipt of varying amounts of stored material from the first named conveyor, and means to move each of the plates separately.

2. In a bottom unloaded storage structure having a trough in the floor extending radially outwardly from the center of the floor and having a conveyor adapted to move circumferentially over the floor and convey the material to be removed to a second conveyor rotating in said trough, the improvement which comprises, a channel-shaped member disposed longitudinally in the trough with the flanges of said member overlying the floor of the trough and the central web of the channel extending slightly below the floor of the structure to divide the trough in two separate passages for rotation of the second conveyor therein, side plate members secured over the side walls of the trough with an upper flange on each member projecting inwardly of the trough at about the level of the floor of the structure, a guide rail secured to each plate member slightly below said upper flanges to provide a way extending substantially the length of the trough, a right angle bar secured to the central web of the channel member on either side thereof and opposite the said guide rails, a plate overlying the angle bars to provide a way in cooperation with the bars on each side of the web of the channel and opposite to the ways adjacent the wall of the trough, a plate disposed in each way on either side of the central web and adapted to move longitudinally of the trough to control the size of the opening to the trough for receipt of varying amounts of stored material from the first named conveyor, a rod secured to the outer end of each of the plates and extending outside of the storage structure and having a plurality of longitudinally spaced vertical holes therein, a manually operated lever adapted to be pivoted on a fulcrum on the outside of the structure and to engage successive holes of each bar to move the plates longitudinally of the trough, and cover plates secured to the floor of the structure and extending over a substantial portion of the trough adjacent the wall of the structure.

References Cited in the file of this patent

UNITED STATES PATENTS 778,113   Clarke _____ Dec. 20, 1904